UNITED STATES PATENT OFFICE.

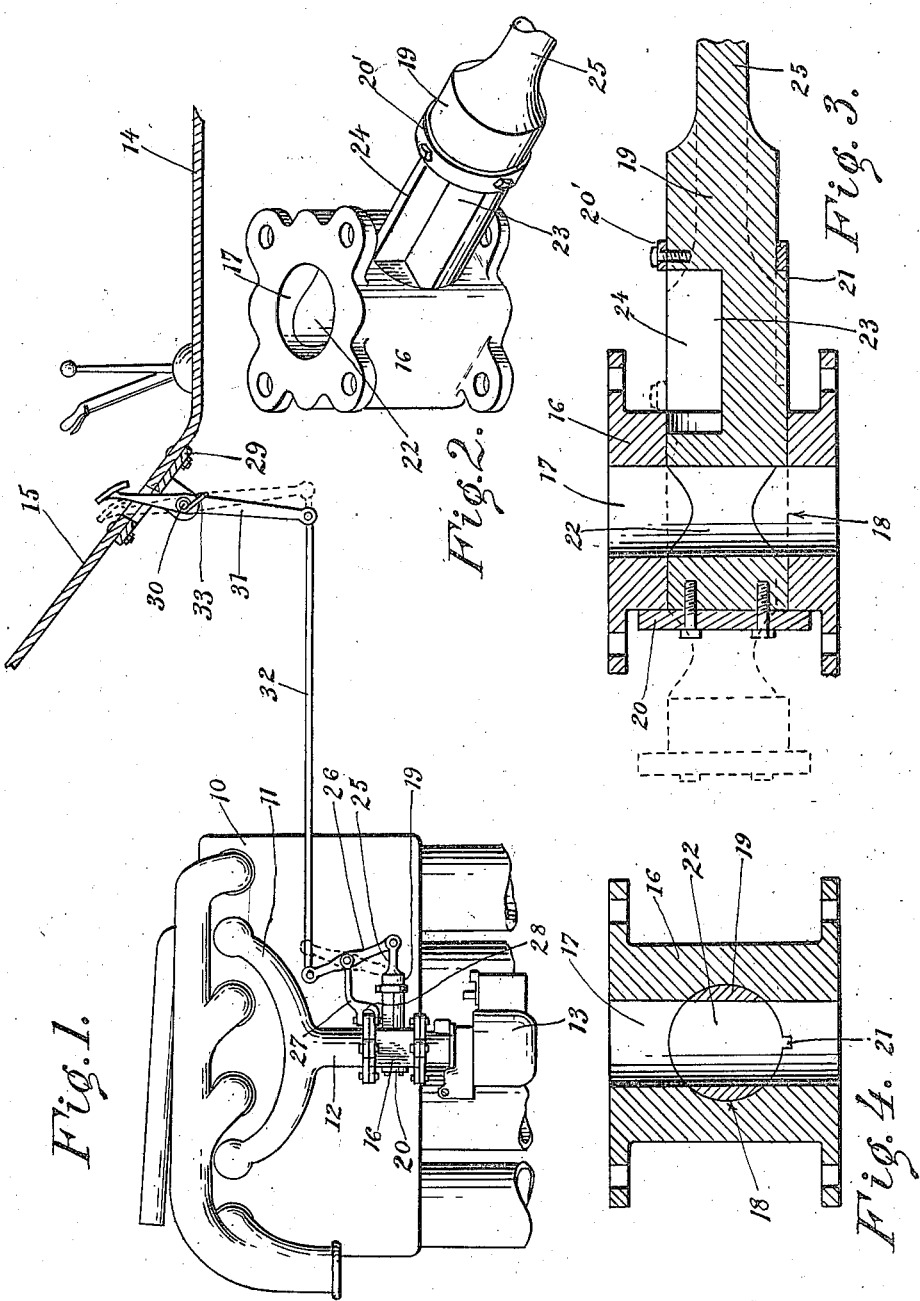

WILLIAM I. SMITH, OF OIL CITY, PENNSYLVANIA.

BRAKING-VALVE FOR INTERNAL-COMBUSTION ENGINES.

1,310,094.  Specification of Letters Patent.  Patented July 15, 1919.

Application filed December 23, 1918. Serial No. 268,023.

*To all whom it may concern:*

Be it known that I, WILLIAM I. SMITH, a citizen of the United States, residing at Oil City, in the county of Venango and State of Pennsylvania, have invented certain new and useful Improvements in Braking-Valves for Internal-Combustion Engines, of which the following is a specification.

This invention relates to an improved braking valve for the engines of motor vehicles and has as its primary object to provide a device of this character which may be operated from the driver's seat of the vehicle for cutting off the flow of fuel mixture to the engine cylinders and simultaneously admitting air to the cylinders so that the engine pistons will work against such air for braking the vehicle while; at the same time, the air will tend to cool and cleanse the cylinders.

The invention has as a further object to provide a valve which may be operated for entirely cutting off any intake flow into the engine cylinders so that the engine pistons will each work against a partial vacuum in the respective cylinders of the engine for braking the engine.

And the invention has as a still further object to provide a valve which may be operated for diluting the fuel mixture in any proportionate quantity desired.

Other and incidental objects will appear during the course of the detailed description of the invention. In the drawings, wherein I have illustrated the preferred embodiment of the invention, and wherein similar reference characters designate corresponding parts throughout the several views:

Figure 1 is a fragmentary side elevation showing my improved valve in connection with the engine of a conventional type of motor vehicle, Fig. 2 is a detail perspective view of the device, Fig. 3 is a longitudinal sectional view taken through the valve, and Fig. 4 is a transverse sectional view of the device.

Referring now more particularly to the drawings, I have shown my improved valve in connection with the engine of a conventional type of motor vehicle. The engine is indicated at 10 and is provided with the usual manifold 11 having a trunk 12. Normally communicating with the manifold is the engine carbureter 13. The floor of the vehicle is indicated at 14 and this floor is provided at its forward end with the usual inclined portion 15.

In carrying the invention into effect, I employ a valve casing 16 provided with a passage 17 therethrough. At its ends the casing is formed with lateral ears or flanges adapted to mate with the flanges at the lower end 12 of the engine manifold and the flanges at the upper end of the carbureter so that the valve casing may be interposed between the carbureter and manifold in the manner shown in Fig. 1. Securing the valve casing in position and engaging through these mating flanges are bolts or other suitable fastening devices. Extending through the valve casing at substantially right angles to the passage 17 is an opening 18 through which is slidably fitted a cylindrical valve plug 19. Secured to the forward end of the plug by screws or other suitable fastening devices is a stop plate 20 adapted to abut the valve casing in the manner shown in Fig. 2 for limiting the valve plug in its rearward movement. Surrounding the rear end portion of the plug is a stop collar 20' connected with the plug by a plurality of radially disposed set screws and adapted to abut the valve casing for limiting the plug in its forward movement. At its lower side the plug is provided with a longitudinal key 21 slidably fitting in a suitable keyway in the valve casing for holding the plug against turning movement. Formed through the forward end portion of the plug is a passage 22 adapted to register with the passage 17 of the valve casing and at its upper side the plug is cut away in the rear of this passage to form a second passage 23 adapted to communicate with the passage 17 and with the outer air. The passage 23 is divided by a partition 24 adapted to contact at its upper edge with the wall of the opening 18 when the valve plug is shifted forwardly through the valve casing to prevent wabbling of the plug within said opening.

Formed on the rear end of the valve plug is a reduced axial extension 25 and swingingly engaged with the outer end of this extension, preferably by a slot and pin connection, is the lower end of a rock arm 26. This arm is swingingly mounted upon a bracket 27 provided at its inner end with a fork 28 embracing the mating flanges at the upper end of the valve casing and the lower end of the manifold trunk and rigidly secured to these flanges by one of the connecting bolts extending through the flanges. Mounted beneath the inclined portion 15 of the floor 14 of the vehicle is a bearing bracket 29 and swingingly mounted upon this bracket by a pivot pin 30 is a foot pedal 31 projecting through the inclined portion of the floor. Extending between the lower end of this pedal and the upper end of the rock arm 26 and pivotally connected therewith is a rod 32. Thus, the pedal is operatively connected with the valve plug and surrounding the pivot pin 30 of the foot pedal is a spring 33 engaged at one end with the bracket 29 and at its opposite end with the pedal for yieldably returning the valve plug when shifted forwardly.

In the normal position of the valve plug, the stop plate 20 is, as shown in Fig. 2, in engagement with the valve casing so that the passage 22 of the plug thus registers with the passage 17 of the casing whereby the fuel mixture from the carbureter is permitted to flow uninterruptedly through the valve to the cylinders of the engine 10. However, when the vehicle is traveling down grade it will be seen that the foot pedal 31 may be pressed forwardly at its upper end for shifting the valve plug forwardly to a middle position with respect to the valve casing when the passage 22 through the plug will be moved out of register with the passage 17 of the valve casing while the passage 23 of the plug will be shifted to establish communication between the passage 17 and the outer air. Flow of fuel mixture from the carbureter to the engine cylinders will thus be entirely cut off while air will be admitted through the valve to the cylinders so that the engine pistons will work against this air within the cylinders for braking the vehicle. At the same time, the flow of fresh air thus had through the cylinders will tend to cleanse the cylinders and cool the engine. A continued flow of cold air through the engine cylinders might, however, in extremely severe weather, cool the engine more than desired. For this reason or if for any other reason it should be desired to stop the flow of air through the cylinders, I provide an arrangement whereby the intake flow through the engine manifold may be entirely cut off. To accomplish this, the foot pedal is moved forwardly to its extreme position when the stop collar 20′ of the valve plug will abut the valve casing. The valve plug will then, as shown in dotted lines in Fig. 2, occupy a position closing the opening 18 through the valve casing as well as closing the passage 17 therethrough, it being observed in this connection that the passage 23 of the plug is of a length somewhat less than the length of the opening 18. Thus, flow from the carbureter to the engine manifold will be cut off as will also any flow of air to the manifold. At the same time, a marked braking effect upon the vehicle engine will be had due to the fact that each of the engine pistons, at its intake stroke, will be working against a partial vacuum within the respective engine cylinders. I accordingly provide an arrangement whereby the valve may be operated for braking the engine and accordingly braking the vehicle both when a flow of air is being admitted to the engine cylinders and when intake flow to the cylinders is entirely cut off. As is well known, it is very often found advantageous to dilute the fuel mixture before its introduction into the engine cylinders. To accomplish this result, the valve plug 19 may be shifted forwardly until the forward end of the passage 23 is brought into communication with the passage 17 through the valve casing while, at the same time, flow through this latter passage through the passage 22 of the plug is maintained. Thus, fuel mixture from the engine carbureter will be drawn up through the passages 17 and 22 of the casing and plug while fresh air will be drawn in through the passage 23 into the passage 17 to become mingled with the fuel mixture, whence the diluted mixture will be delivered to the engine cylinders. In this connection, it is to be particularly noted that the proportion of fresh air admitted may be readily varied by slowly moving the valve plug forwardly so as to contract the effective area of the passage 22 through the plug and similarly enlarge the effective area of the passage 23 of the plug at the passage 17 through the valve casing.

Having thus described the invention, what is claimed as new is:

1. A braking valve for internal combustion engines including a valve casing adapted to be interposed between an engine intake manifold and carbureter to communicate therewith, a valve plug reciprocable through the casing, means for establishing uninterrupted flow through the valve casing in one position of the plug, means for cutting off said flow and establishing flow through the casing from the outer air in another position of the plug, and means for cutting off all flow through the casing in a third position of the plug.

2. A braking valve for internal combustion engines including a valve casing adapted to be interposed between an engine manifold and carbureter and provided with a passage to communicate therewith, and a valve plug shiftable upon the casing and provided with passages adapted to communicate with the passage of the valve casing, the plug being shiftable to one position establishing uninterrupted flow through the casing, to another position cutting off such flow, and establishing communication between the passage of the valve casing and the outer air, and to a third position cutting off all flow through the passage of the valve casing.

3. A braking valve for internal combustion engines including a valve casing adapted to be interposed between an engine manifold and carbureter and provided with a passage to communicate therewith, and a valve plug reciprocable through the casing and provided with a main passage therethrough normally establishing uninterrupted flow through the passage of the casing, the plug being cut away at one side to form an auxiliary passage and said plug being movable to a middle position cutting off said flow and establish communication between the valve casing passage and the outer air through the auxiliary passage, the plug being movable to a third position cutting off all flow through the passage of the valve casing.

4. A braking valve for internal combustion engines including a valve casing adapted to be interposed between an engine intake manifold and carbureter, the casing being provided with a passage therethrough and with an opening at an angle to said passage, and a valve plug slidably fitted through said opening, the plug being formed with a passage therethrough adapted to establish flow through the passage of the valve casing in one position of the plug and being formed with a second passage adapted to establish communication between the passage in the valve casing and the outer air in a second position of the plug cutting off said flow, the plug being shiftable to a third position closing the valve casing passage.

5. A braking valve for internal combustion engines including a valve casing adapted to be interposed between an engine intake manifold and carbureter, the casing being provided with a passage therethrough and with an opening at an angle to said passage, a valve plug slidable through said opening, and means carried by the plug to selectively engage the valve casing for limiting the plug in its movement in opposite directions, the plug being provided with a passage therethrough adapted to establish uninterrupted flow through the passage of the valve casing in one position of the plug and being provided with a second passage adapted to establish communication between the passage of the casing and the outer air in another position of the plug cutting off said flow, the plug being movable to a third position closing the passage through the valve casing.

6. A braking valve for internal combustion engines including a valve casing adapted to be interposed between an engine intake manifold and carbureter and provided with a passage to communicate therewith, the casing being formed with an opening at an angle to said passage, a valve plug slidable through said opening, means carried by the plug to coact with the casing for holding the plug against rotation, the plug being provided with a passage therethrough adapted to establish uninterrupted flow through the passage of the valve casing in one position of the plug and being cut away at one side to provide a passage adapted to establish communication between the passage of the valve casing and the outer air in another position of the plug cutting off said flow, the plug being movable to a third position closing the passage through the valve casing, and a bearing partition dividing said second mentioned passage of the plug and adapted to coact with the wall of said opening in the valve casing for steadying the valve when shifted within said opening.

In testimony whereof I affix my signature.

WILLIAM I. SMITH. [L. S.]